United States Patent
Kumar et al.

(10) Patent No.: US 10,692,127 B1
(45) Date of Patent: Jun. 23, 2020

(54) INFERRING USER DEMOGRAPHICS FROM USER BEHAVIOR USING BAYESIAN INFERENCE

(71) Applicant: Amazon Technologies, Inc., Seattle, WA (US)

(72) Inventors: Pooja Ashok Kumar, Bangalore (IN); Roopesh Ranjan, Redmond, WA (US); Neela Kamlakar Sawant, Jersey City, NJ (US)

(73) Assignee: Amazon Technologies, Inc., Seattle, WA (US)

( * ) Notice: Subject to any disclaimer, the term of this patent is extended or adjusted under 35 U.S.C. 154(b) by 577 days.

(21) Appl. No.: 15/292,042

(22) Filed: Oct. 12, 2016

(51) Int. Cl.
*G06Q 30/00* (2012.01)
*G06Q 30/06* (2012.01)
*G06N 5/04* (2006.01)
*G06N 7/00* (2006.01)

(52) U.S. Cl.
CPC ......... *G06Q 30/0631* (2013.01); *G06N 5/048* (2013.01); *G06N 7/005* (2013.01)

(58) Field of Classification Search
CPC .................. G06F 19/00; G06N 7/005; G06Q 30/0601–0645; G06Q 30/80
USPC ..... 705/26.1, 27.1, 26.2, 26.25, 26.3, 26.35, 705/26.4, 26.41, 26.42, 26.43, 26.44, 705/26.5, 26.6, 26.61, 26.62, 26.63, 705/26.64, 26.7, 26.8, 26.81, 26.82, 26.9, 705/27.2
See application file for complete search history.

(56) References Cited

U.S. PATENT DOCUMENTS

| 8,145,512 | B1 | 3/2012 | Henne et al. |
| 8,175,989 | B1* | 5/2012 | Gopinath ............... G06N 7/005 706/45 |
| 2002/0099594 | A1* | 7/2002 | Heard .................... G06Q 20/10 706/12 |
| 2009/0132347 | A1 | 5/2009 | Anderson et al. |
| 2013/0212110 | A1 | 8/2013 | Stankiewicz et al. |
| 2014/0067597 | A1* | 3/2014 | Kirkby ............... G06Q 30/0631 705/26.7 |
| 2015/0081431 | A1 | 3/2015 | Akahoshi et al. |
| 2015/0112801 | A1 | 4/2015 | Nice et al. |

(Continued)

OTHER PUBLICATIONS

J. Hu et. al, "Demographic prediction based on a user's browsing behavior," (2007) 16th International World Wide Web Conference, WWW2007, pp. 151-160.*

(Continued)

*Primary Examiner* — Brandy A Zukanovich
(74) *Attorney, Agent, or Firm* — Knobbe, Martens, Olson & Bear, LLP

(57) ABSTRACT

Systems and methods are provided for determining or predicting user demographic information using user behaviors through a Bayesian inference. A computing system may determine demographic information (such as age or gender) of a user based on a Bayesian update and a purchase or other user action by the user. In some embodiments, the computing system may determine the household composition of a user account based on multiple purchases by the user account. The computing system may generate recommendations for the user or the user account based on the demographic information of the user or the household composition of the user account.

19 Claims, 5 Drawing Sheets

(56) References Cited

U.S. PATENT DOCUMENTS

2016/0191970 A1    6/2016  Sheppard et al.

OTHER PUBLICATIONS

Blei, D.M., et al. Latent dirichlet allocation. J. Mach. Learn. Res. (Jan. 2003).

Blei, D.M., et al. Supervised topic models, Advances in Neural Information Processing Systems (Sep. 2008).

Dong, Y., et al. Inferring user demographics and social strategies in mobile social networks. Proceedings of the $20^{th}$ ACM SIGKDD International Conference on Knowledge Discovery and Data Mining, KDD '14, pp. 15-24. ACM (Aug. 2014).

Griffiths, T.L., et al. Finding scientific topics, Proceedings of the National Academy of Sciences (Apr. 2004).

Hu, J., et al. Demographic prediction based on user's browsing behavior. Proceedings of the 16th International Conference on World Wide Web, WWW '07, pp. 151-160, ACM (May 2007).

Kabbur, S., et al. Content-based methods for predicting web-site demographic attributes. Proceedings of the 2010 IEEE International Conference on Data Mining, ICDM '10, pp. 863-868. IEEE Computer Society (Dec. 2010).

Kooti, F., et al. Portrait of an online shopper: Understanding and predicting consumer behavior, Proceedings of the 9th ACM International Conference on Web Search and Data Mining, WSDM '16. ACM (Dec. 2015).

Kosinski, M., et al. Private traits and attributes are predictable from digital records of human behavior, Proceedings of the National Academy of Sciences of the United States of America (PNAS) (Apr. 2013).

Peersman, C., et al. Predicting age and gender in online social networks. Proceedings of the 3rd International Workshop on Search and Mining User-generated Contents, SMUC '11, pp. 37-44. ACM (Oct. 2011).

Perozzi, B., et al. Exact age prediction in social networks, Proceedings of the 24th International Conference on World Wide Web, pp. 91-92, New York, N.Y. USA (May 2015) ACM.

\* cited by examiner

INFERRING USER DEMOGRAPHICS FROM USER BEHAVIOR USING BAYESIAN INFERENCE

BACKGROUND

Models representing data relationships and patterns, such as functions, algorithms, systems, and the like, may accept input (sometimes referred to as an input vector), and produce output (sometimes referred to as an output vector) that corresponds to the input in some way. For example, a model may be implemented as a machine learning model. A machine learning algorithm may be used to learn a machine learning model from training data. The parameters of a machine learning model may be learned in a process referred to as training. For example, the parameters or weight values of a machine learning model may be learned using training data, such as historical data that includes input data and the correct or preferred output of the model for the corresponding input data. A machine learning model may be used to compute predictions based on historical data.

BRIEF DESCRIPTION OF THE DRAWINGS

The foregoing aspects and many of the attendant advantages will become more readily appreciated as the same become better understood by reference to the following detailed description, when taken in conjunction with the accompanying drawings, wherein.

DETAILED DESCRIPTION

Figure 1:
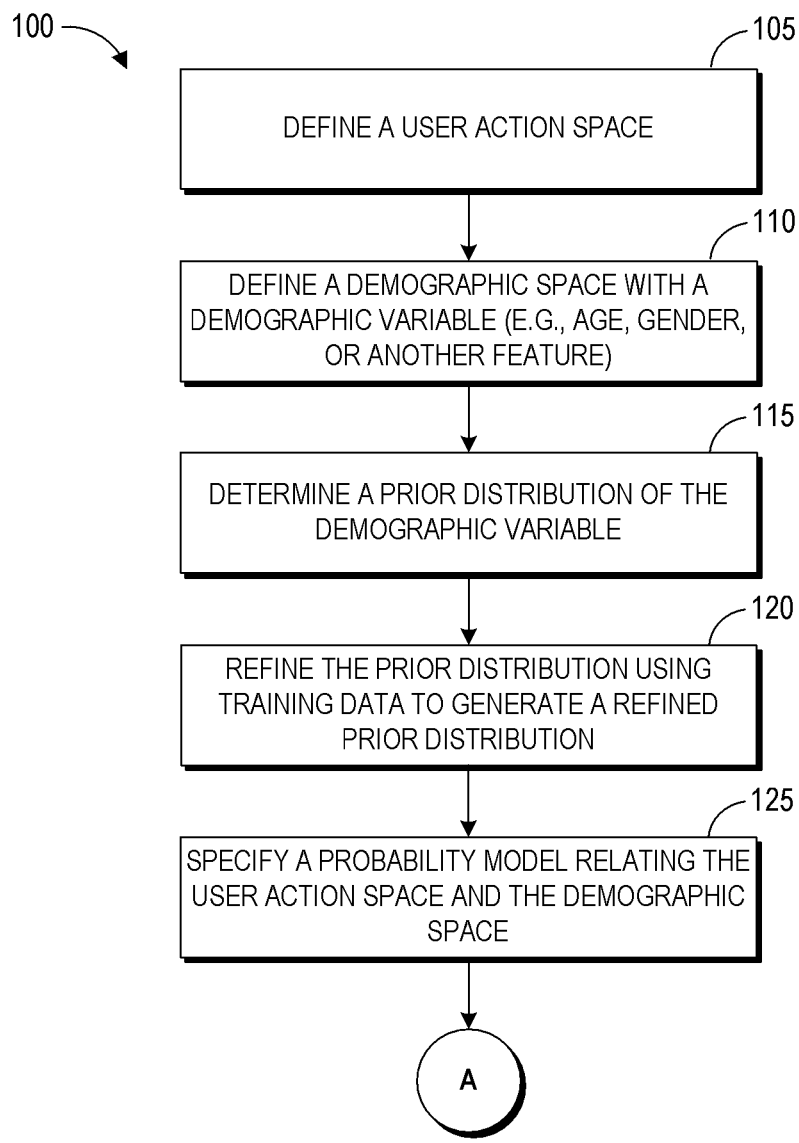
FIG. 1 is a flow diagram depicting an illustrative method for determining demographic information.

Generally described, aspects of the present disclosure relate to predicting the demographic information of a user. The demographic information of a user may be learned using a demographic model based on a Bayesian inference. Knowledge of the demographic information of a user may help engage the user with relevant marketing information and improve user experience, such as personalized item recommendations and/or rankings of items of potential interest to the user. Personalized item recommendations and rankings may be effective in increasing user or customer engagement and satisfaction, for example, in electronic commerce. Methods for personalized item recommendations may use the purchase history and demographic information (such as age, gender, education, profession, and/or other information). However, demographic information may be unknown for a majority of users of a service (such as an electronic commerce website).

In contrast, a demographic model may be used to learn the demographic information of a user. In some implementations, the demographic model may outperform other techniques for determining the demographics of users. Accordingly, personalized item recommendations and rankings may be improved using the demographic model. To learn the demographic model, user interactions with a service may be modeled. For example, user interactions with an electronic commerce website, such as search, browse, purchase, and/or subscriptions, may be used to learn the demographic model. In some embodiments, the demographic composition of a household may be determined based on multiple purchases by a user account.

The growing volume of network-accessible content has posed significant challenges for users and businesses (for example, a business operating an electronic commerce website) alike. As a result, on the one end, users may rely more and more on businesses to determine the most relevant content that aligns with their needs, interests, and tastes. On the other end, businesses may strive to delight users by providing a customized experience. Personalization, in the form of item recommendations and content rankings, has become common to address these issues. For instance, an electronic commerce website may provide personalized item recommendations based on the interests and demographics of its users. Similarly, search results, content sharing sites (for example, for sharing news, videos, photos, or music) and feeds on social networking sites may be ranked with respect to user preferences.

In some embodiments, a personalization system may rely on the availability of detailed user data, such as user demographic information (for example, age, gender, education, profession, and/or other information) and user preferences based on past purchases and page views. The systems and methods disclosed herein may advantageously overcome challenges relating to obtaining user demographic information and user preferences. Although an electronic commerce website may have a wide user base, the website operator may not be able to (or not choose to) obtain demographic information, such as age and gender, directly from its users. For example, a retailer may not wish to prompt its users for detailed demographic information that users may be hesitant to provide in the retail context.

In contrast, content-based and social networking platforms may obtain detailed personal information of users directly. In some embodiments, a personalization system may rely on user behavior or action, which may be indicative of their demographics, such as age and gender of household members. Consumer surveys may contain detailed personal information, such as (a) women may be more likely to shop for deals or baby care items than men, (b) younger users may be more likely to shop for digital items, or (c) a subscription to a service targeting mothers may suggest presence of a young child in the household and the likely gender of the user is female.

In some embodiments, a personalization system may be based on the demographic compositions of user accounts. Based on the observable actions by a user account, the demographic composition of a household whose members share the user account may be predicted based on multiple purchases by the user account. Predicting the user demographic composition of the user account may be advantageously used for generalized and/or personalized marketing. With generalized marketing, after predicting the demographic composition of a user account (such as a father, a mother, and a child), marketing materials may be sent to the user account via, for example, an email targeting some or all of the members of the household. With personalized marketing, the demographic information of a user of a user account active during a browsing session may be used in making specific item recommendations for the active user during the browsing session.

FIG. 1 is a flow diagram depicting an illustrative method 100 for determining demographic information. The method 100 may be embodied in a set of executable program instructions stored on a computer-readable medium, such as one or more disk drives, of a computing system, such as the computing system 500 shown in FIG. 5 and described in greater detail below. When the method 100 is initiated, the executable program instructions may be loaded into memory, such as RAM, and executed by one or more processors of the computing system 500. Although the method 100 is described with respect to the computing system 500 shown in FIG. 5, the description is illustrative only and is not intended to be limiting. In some embodiments, the process 100 or portions thereof may be performed serially or in parallel by multiple computing systems.

The illustrative method 100 may utilize a demographic model to determine demographic information of a user. The demographic information may in turn be used for personalization, such as item recommendations and content rankings. The illustrative method begins at block 105, where the computing system 500 defines a user action space. A user action by a user may be selected from the user action space. For example, a user action may be a purchase by a user. The user may purchase, for example, digital items, consumable items, such as baby care items or baby wipes, textbooks, or home and gardening items listed in an electronic catalog. As another example, a user action may be subscribing to one or more memberships, such as a pantry program, a fresh delivery program, a streaming service, or a life-stage program (such as programs targeting mothers or students). As a further example, a user action may include search or browsing history of a user (for example, browsing in certain item categories, or browsing within specific stores or sub-stores of a retailer, such as fashion stores, kid stores, or toy stores). As yet another example, a user action may include using a specific device (such as a mobile phone), actions within a social networking service, or expressing interest or a positive rating in a certain page, image or post.

The user action space may include at least one of a search history variable, a browsing history variable, a purchase history variable, or a subscription variable. Thus, a user action space may include some or all possible user actions by users. For example, the user action space may include purchasing one of the items available for purchase by users, such as all items on an electronic catalog. As another example, the user action space may include session level behaviors such as viewing a webpage of an electronic commerce website or searching for a specific term. As a further example, the user action space may include subscribing to a service available offered by a video or audio steaming service. The user action space may be a user action space of a demographic model. Accordingly, a user action space of a demographic model may include possible user actions that can be used as input of the demographic model.

At block 110, the computing system 500 may define a demographic space with a demographic variable. In some embodiments, the demographic information represented by the demographic variable may include a user's age or gender. The demographic variable may include two or more sub-variables. The values of the demographic variable may be combinations of values of multiple sub-variables. For example, a value of the demographic variable may be "a male, 18-26 years old, and interested in photography."

The demographic variable may be a categorical variable. For example, a user's gender represented by a gender variable may be a male categorical value or a female categorical value. The gender information may have a Bernoulli distribution (for example, for inferring a user's gender from a single action by the user) or a binomial probability distribution (for example, for inferring a user's gender from multiple actions by the user). In embodiments in which the gender variable may have a non-binary gender values, the gender information may have a multinomial probability distribution. As another example, a user's age represented by an age variable may have a value selected from a plurality of age bands. The age bands may be, for example, 0-5 years old, 6-17 years old, 18-25 years old, 26-40 years old, 40-60 years old, or 60 years old or older. The age information may have a multinomial probability distribution. A user with a combination of gender and age information may be a male pre-teen, a female teenager, a father, or a mother. In some embodiments, at block 110, the computing system 500 may define a probability distribution of a variable, such as a user's taste, interest, education, or profession.

At block 115, the computing system 500 may determine a prior distribution of the demographic variable. Determining the prior distribution of the demographic variable may include determining the prior distribution of the demographic variable based at least in part on a distribution of values of the demographic variable for a plurality of users (such as users of an electronic commerce website). The prior distribution of the demographic variable may be a broad distribution based on a majority, substantially all, or all of the users. For example, prior to refining the distribution based on training data (discussed below), the model may assume that any value of any demographic variable is equally likely, or that the distribution will match the general distribution of age, gender, or other variable of interest across a full population (such as all users of a given service).

At block 120, the computing system 500 may refine the prior distribution using training data and a Bayesian update to generate a refined prior distribution. Refining the prior distribution of the demographic variable using the Bayesian update may be based at least in part on another distribution of values of the demographic variable for another plurality of users. Demographic information of this other plurality of users may be available.

In some embodiments, the training data may be based in part on survey data in combination with user action data from another source. For example, if the survey data shows that a percentage of users who purchase diapers are women, this information may be used to learn a refined prior distribution of the demographic model. A posterior distribution of the demographic variable may be determined using this survey data and the prior distribution determined at block 115. As another example, if a percentage of users belonging to a specific age-band also engage in a user action, the prior probability of an age demographic variable may be determined. Advantageously, survey data may be used to determine a substantive prior distribution on the demographic variable, which may in turn strengthen the inference.

Training data may be obtained, for example, from surveys, self-provided information when signing up for a program (such as a streaming service), user information provided during registrations of a subscription program (such as life-stage subscription programs), or social media data. Training data may be from a third party data, such as a social media service or a personal information provider associated with a credit bureau or other service. The training data may be from a data warehouse, such as a service associated with a third party provider of personal information and/or a social networking service, which contains the age information and household compositions (single or multi-household) for some user accounts. In some embodiments, data from multiple warehouses may be combined to generate training data. In some embodiments, training data may include at least one of gender, time-of-purchase, page views, or session level browsing behavior. In some embodiments, the training data may contain demographic information of single-person households. In other embodiments, the training data may contain demographic information of mostly of single-person households.

In some embodiments, no prior information may exist for a specific action. Then, a non-informative prior on the distribution may be used. The non-informative prior may express vague or general information for the specific action. For example, all actions may be equally likely in a non-informative prior. Alternatively or in addition, a proxy prior from correlated consumer actions may be used. For example, people who purchase car parts may also purchase tools. Thus, the prior distribution for car parts may be similar to that of tools. As another example, people who purchase item X also purchase item Y. Thus, the prior distribution for item Y may be similar to that of item X.

At block 125, the computing system 500 may specify a probability model relating the user action space and the demographic space. The probability model may be a regression model such as a linear regression model or a logistic regression model. In some embodiments, the probability model may relate a subscription variable to a demographic variable. For example, the probability model may relate whether a user subscribes to a life-stage program targeting mothers and the user's age or gender. A user not subscribing to the life-stage program may be represented by the value zero in the probability model. A user subscribing to the life-stage program may be represented by the value of one in the probability model. The probability model may specify that females of the age 25-40 years old are more likely to subscribe to a life-stage program targeting mothers. Accordingly, if a user has subscribed to a life-stage program targeting mothers, the demographic information of the user is more likely to be a female of the age 25-40 years old.

Figure 2:
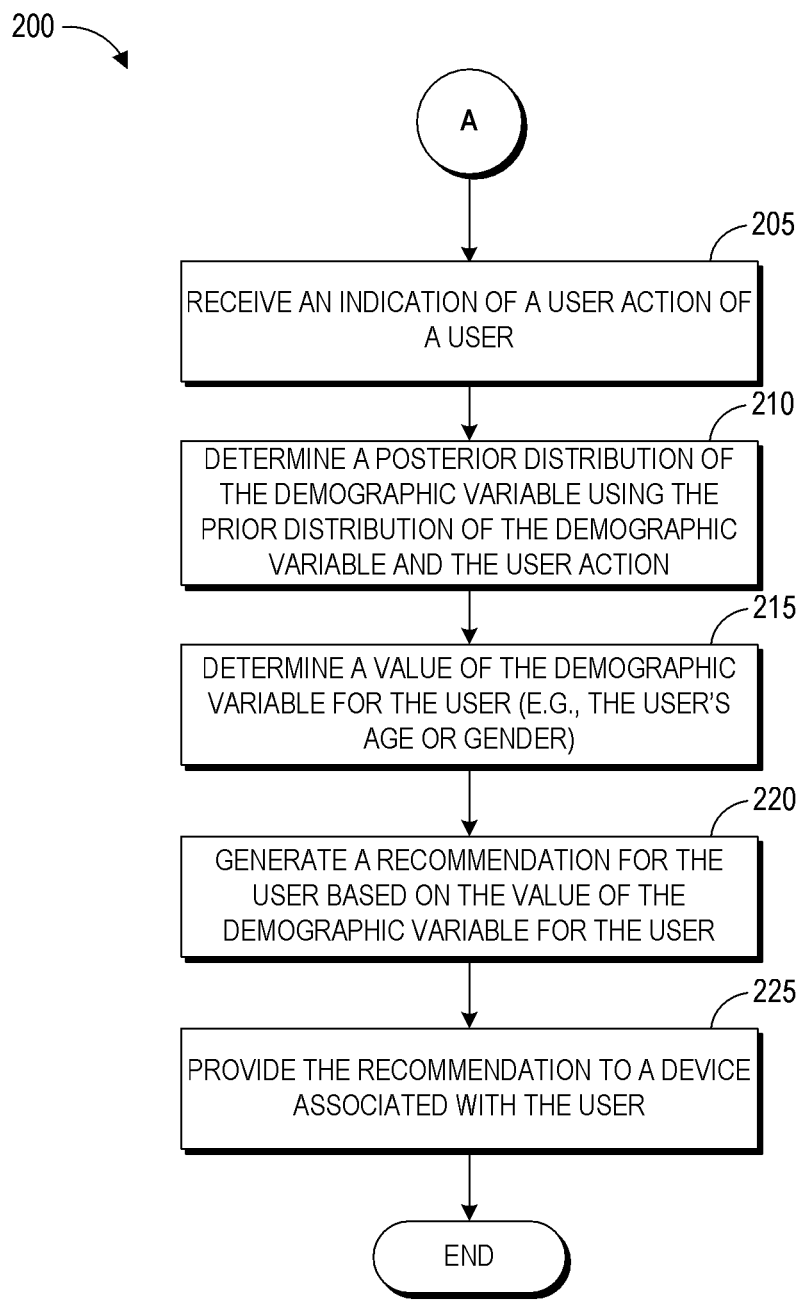
FIG. 2 is a flow diagram depicting an illustrative method for generating an item recommendation for a user account based on a user action by the user account and demographic information of the user account.

FIG. 2 is a flow diagram depicting an illustrative method 200 for generating an item recommendation for a user account based on a user action by the user account and demographic information of the user account. The process 200 may be embodied in a set of executable program instructions stored on a computer-readable medium, such as one or more disk drives, of a computing system, such as the computing system 500 shown in FIG. 5 and described in greater detail below. When the process 200 is initiated, the executable program instructions may be loaded into memory, such as RAM, and executed by one or more processors of the computing system 500. Although the process 200 is described with respect to the computing system 500 shown in FIG. 5, the description is illustrative only and is not intended to be limiting. In some embodiments, the process 200 or portions thereof may be performed serially or in parallel by multiple computing systems.

The illustrative method 200 may be implemented following implementation of method 100, discussed above, such that block 205 occurs subsequent to block 125 described above. Demographic information identified for a user may be used for targeting a specific user account. For example, if there are teenagers in a household, the account of the household may be targeted with student-specific messages or certain advertisements for books and items aimed at students. Similarly, knowing that a household has a woman may be a criterion for fashion-based messages for that account. Furthermore, while a user browses items on an electronic website, knowledge of the demographics information may be used to automatically filter items (for example, toys, shoes, apparel, or baby food) based on the age and gender of the user during that browsing session. In addition, knowledge of the users may be used in suggesting subsequent needs, rather than those based on current needs or browsing patterns. For instance, knowing that an infant resides in a household may help item recommendations for toddlers subsequently as the infant grows. Also, users of a household identified may be used for targeting specific memberships or subscriptions, such as student or young adult programs. Based on the different demographic information, a pantry program may appropriately recommend quantities of items. Identification of the user within a session may help in making specific item recommendations for the active user. In addition, analyzing purchase patterns at a user level may be conducted to identify the most popular items for specific demographics.

At block 205, the computing system 500 may receive an indication of a user action. The user action may correspond to at least one variable in the user action space. The user action space may include, for example, at least one of a search history variable, a browsing history variable, a purchase history variable, or a subscription variable. A user action space can include some or all possible user actions by users. For example, the user action may be purchasing one of the items available for purchase by users, such as all items on an electronic catalog. As another example, the user action may be viewing one of the webpages of an electronic commerce website. As a further example, the user action space may include subscribing to one of the subscription services available (such as a video or audio steaming service). The user action may be associated with addition information, such as the time of purchase, or session level browsing behavior prior to making a purchase. After the user places an order with an electronic commerce website, the website may provide information contained in the order (such as time of purchase, the item purchased, the item type, and/or other information) to the computing system 500. As another example, the user action may be the user account having viewed or purchased an item or subscribed to a service.

At block 210, the computing system 500 may determine a posterior distribution of the demographic variable using the prior distribution of the demographic variable and the user action. For example, as a user takes each subsequent action, an inference of the demographic variable taking on a particular categorical value may be updated using a Bayesian update. The Bayesian update may be represented by Equation [1], in some embodiments.

$$\text{Posterior} \sim \text{Prior} \times \text{Likelihood}, \qquad [1]$$

where "Prior" denotes the before-update probability distribution (probability distribution) of a user under consideration having a particular categorical value, "Likelihood" denotes the updated probability distribution of a user that has the particular categorical value engaging in the user action, and "Posterior" denotes the after-refined probability distribution (refined probability distribution) relating to an updated belief that the user has the same categorical value.

At block 215, the computing system 500 may determine a value of the demographic variable for the user. For example, the value of the demographic variable for the user may be the male categorical value. When a user takes multiple user actions, the posterior distribution of the demographic variable may peak at a dominant value having high entropy, indicating the most likely categorical value for the user.

In some embodiments, actions by a user account may be observable. However, the actions by the user account may be attributable to one or more users sharing the user account. When a user account takes multiple user actions, the posterior distribution of the demographic variable may have multiple peaks, indicating the user account is used by a multiple-person household or a user has multiple interests. For example, a user account may be used by members of a household that includes a husband and a wife. The demographic variable may have two peaks corresponding to the genders of the husband and wife. In some embodiments, if the husband and the wife are similar in age, the demographic variable may have one peak corresponding the average age of the husband and wife. As another example, a user account may be used by members of a household that includes a father, a mother, and a child. If the mother and the father are similar in age, the demographic variable may have two peaks corresponding to the average age of the mother and father and the age of the child.

At block 220, the computing system 500 may generate a recommendation for the user based on the value of the demographic variable for the user. A recommendation may include predicted future user purchase behavior and/or item recommendations for users. For example, recommendations of items that a user may wish to view, obtain, or access, may be generated based on the user's prior actions regarding other items.

At block 225, the computing system 500 may provide the recommendation to a computing device associated with the user. For example, the recommendation may be displayed to the computing device associated with the user when the user makes the purchase or at a later time via a user interface presented to a computing device that has logged into the user account. It will be appreciated that examples above are for illustrative purposes only, and that the demographic model may be based on other demographics as well (such as gender, interest, education, and/or profession). The computing system 500 may provide the user the recommendation directly or indirectly through an application or service, such as an electronic catalog of an electronic commerce website.

Figure 3:
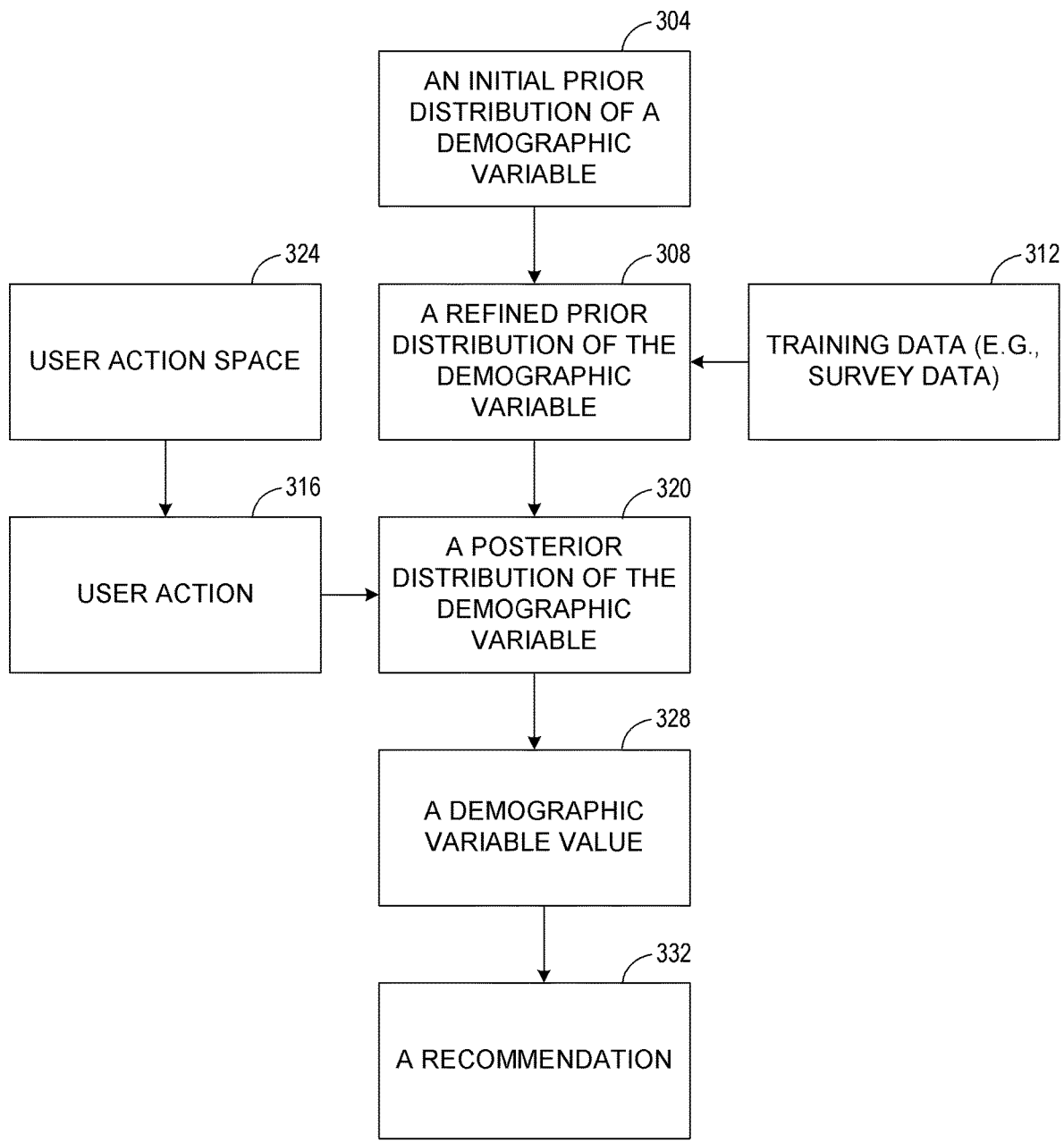
FIG. 3 is schematic illustration of a demographic model for generating item recommendations.

FIG. 3 is schematic illustration of a demographic model for generating item recommendations. The demographic model may include an initial prior distribution 304 of a demographic variable. The demographic variable may include an age variable or a gender variable. In some embodiments, the demographic variable can capture a user's interests, tastes, education, or profession. The initial prior distribution 304 of the demographic variable may be determined from a subset of users of a service (such as an electronic commerce website). For example, the initial prior distribution 304 of the demographic variable may be determined from substantially all users of a service.

The initial prior distribution 304 of the demographic variable may be refined to generate a refined prior distribution 308 of the demographic variable using training data 312. Refining the initial prior distribution 304 of the demographic variable using the training data 312 may be referred to as an informative initialization process. The training data 312 may be survey data from a third party, such as a service associated with a third party provider of personal information and/or a social networking service. Data from multiple data stores may be combined to generate the training data 312. Survey data may be available for another subset of users of the service. For example, survey data may be available for half of the users of a service.

When a user performs a user action 316, a posterior distribution 320 of the demographic variable may be determined. The user action 316 may be selected from a user action space 324. The user action space may include at least one of a search history variable (such as items or phrases searched), a browsing history variable (such as items or pages browsed), a purchase history variable (such as items searched), or a subscription variable (such as services subscribed). The posterior distribution 320 of the demographic variable may be determined by Equation [1] above.

Based on the posterior distribution 320 of the demographic variable, a value of the demographic variable 328 may be determined. For example, an age value or an age band of the demographic variable 328 may be determined. As another example, a gender value of the demographic variable 328 may be determined. As yet another example, an interest, taste, education, or profession of a user may be determined. If a user has multiple interests, the prior distribution 320 may have multiple peaks corresponding to the multiple interests. The determination of a value 328 of the demographic variable from the posterior distribution 320 of the demographic variable, which in turn is determined from the refined prior distribution 308 of the demographic variable, may be referred to as a backward process.

With the value of the demographic variable 328, a recommendation 332 (such as an item recommendation) may be generated for the user. This may be referred to as a forward process. In some embodiments, a recommendation 332 may be generated for the user while or after the user is browsing an electronic catalog of an electronic commerce website. In some embodiments, a recommendation 332 may be generated for the user after a delayed time period after a purchase by the user. For example, after a user purchases an item for an infant, a recommendation for an item for a toddler may be generated for the user after a delayed time period, such as two years.

Figure 4:
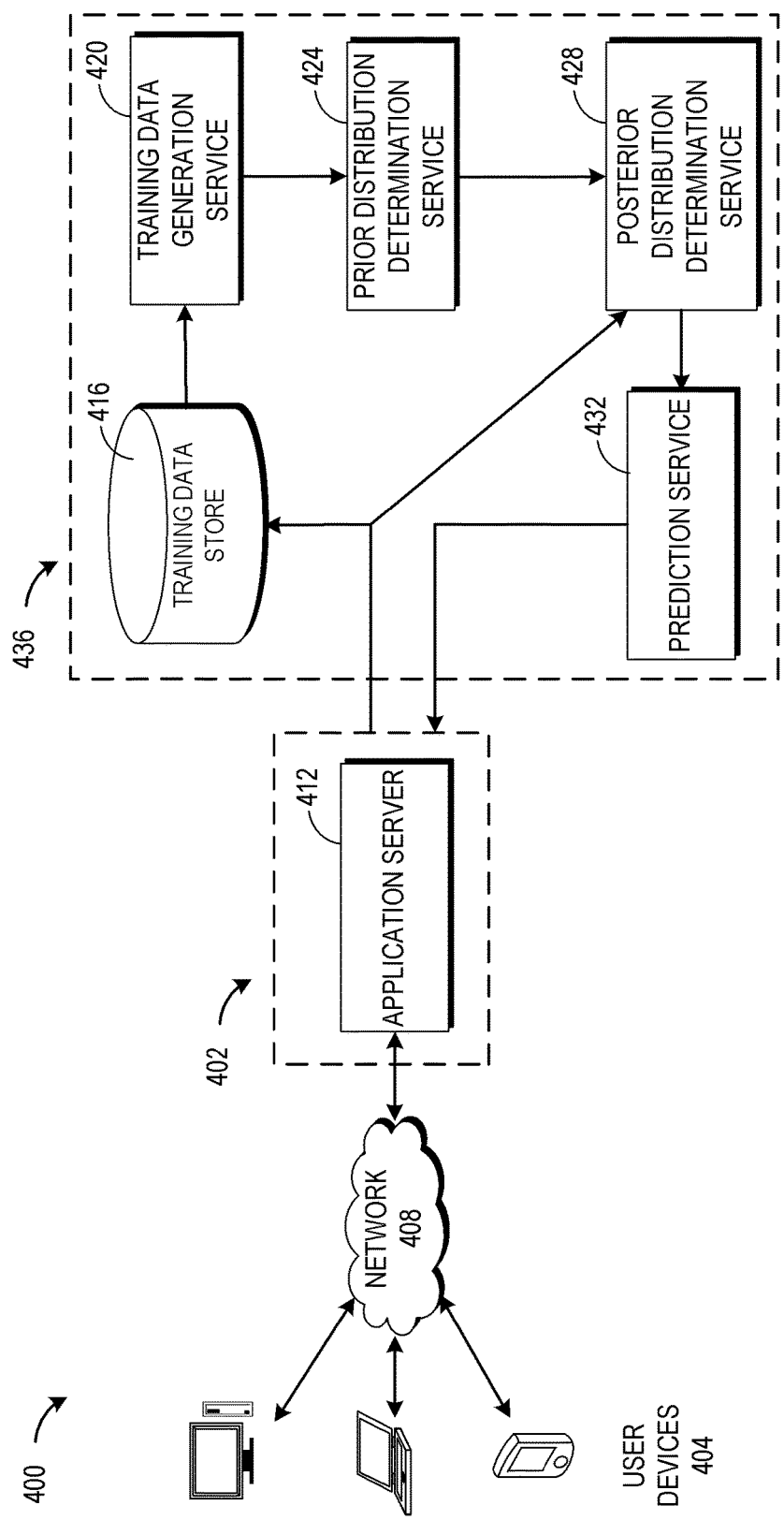
FIG. 4 is a block diagram depicting an illustrative operating environment for determining demographic information of a user account and generating item recommendations for the user account based on the demographic information.

FIG. 4 is a block diagram depicting an illustrative operating environment 400 for learning a demographic model and generating predictions using the learned demographic model. The illustrative operating environment 400 shown in FIG. 4 includes an electronic commerce system that enables users to browse items (such as items listed in an electronic catalog for purchase) using user devices 404 through a communication network 408. The electronic commerce system 404 may also provide users with recommendations. In some implementations, the computing system 402 may provide content streaming services to users. As will be appreciated, a retail service and/or a streaming service are simply provided as examples, as aspects of the present disclosure are applicable to a large number of other environments where predictions may be made using a machine learning model.

The electronic commerce system 402 may include an application server 412 (for example, a retail server, or a streaming server) that provides users with an electronic catalog of items for purchases. The application server 412 may facilitate electronic browsing and purchasing of items using various user devices, such as user computing devices 404 (which may alternatively be referred to herein as client computing devices), through the communication network 408. The application server 412 is generally responsible for providing front-end communication with various user devices, such as a user computing device 404, via the network 408. The front-end communication provided by the application server 412 may include generating text and/or graphics, possibly organized as a user interface using hypertext transfer or other protocols in response to information inquiries received from the various user devices 404.

User computing devices 404 may be any of a number of computing devices that are capable of communicating over a network including, but not limited to, a laptop, personal computer, personal digital assistant (PDA), hybrid PDA/mobile phone, mobile phone, smartphone, electronic book reader, digital media player, tablet computer, gaming console or controller, kiosk, augmented reality device, other wireless device, set-top or other television box, and the like.

In the environment 400 shown in FIG. 4, a user of the electronic commerce system 402 may utilize a user computing device 404 to communicate with the application server 412 (for example, a retail server) via the communication network 408, such as the Internet or other communications link. The network 408 may be any wired network, wireless network or combination thereof. In addition, the network 408 may be a personal area network, local area network, wide area network, cable network, satellite network, cellular telephone network, etc. or combination thereof. For example, the network 408 may be a publicly accessible network of linked networks, possibly operated by various distinct parties, such as the Internet. In some embodiments, the network 408 may be a private or semi-private network, such as a corporate or university intranet. The network 308 may include one or more wireless networks, such as a Global System for Mobile Communications (GSM) network, a Code Division Multiple Access (CDMA) network, a Long Term Evolution (LTE) network, or some other type of wireless network. The network 408 may use protocols and components for communicating via the Internet or any of the other aforementioned types of networks.

The application server 412 may be connected with or in communication with a training data store 416, which may store training data. Training data may include account information, purchase history, browsing history, item reviews and ratings, personal information, location information, billing information, and/or other information, depending on the embodiment. The training data store 416 may include information regarding users' previous actions, such as previous purchases. The application server 412 may provide indications of user actions with respect to the application server 412 to the training data store 416.

In some embodiments, the training data store 416 may be local to the electronic commerce system 402, may be remote from the electronic commerce system 402, and/or may be a network-based service itself. The illustrated data store may be embodied in hard disk drives, solid state memories, any other type of non-transitory computer-readable storage medium, and/or a file, a database, a relational database, in-memory cache, and/or stored in any such non-transitory computer-readable medium accessible to the application server 412 and/or a training data generation service 420. The data store 416 may also be distributed or partitioned across multiple local and/or storage devices, or combined into a single storage device, without departing from the spirit and scope of the present disclosure.

The training data generation service 420 may be connected to or in communication with the training data store 416. The training data generation service 420 may send instructions to the training data store 416 that provide the training data store 416 with the criteria for creating the training data. In some implementations, instead of providing the training data store 416 with the criteria for creating the training data, the training data generation service 420 may create training data from the data received from the training data store 416. The training data generation service 420 may provide a prior distribution determination service 424 with training data, which the prior distribution determination service 424 may use to learn a prior distribution of a demographic variable. The prior distribution determination service 424 may provide the prior distribution of the demographic variable to a posterior distribution determination service 428.

After observing a user action of a user (such as item purchases, page views and/or other actions), the application server 412 may provide the observed user action with respect to the application server 412 to the posterior distribution determination service 428. The posterior distribution determination service 428 may determine, for the user, a posterior distribution of the demographic variable based on the prior distribution of the demographic variable and the user action. The posterior distribution determination service 428 may, for example, determine a dominant age of the user account, an age of an active user of a browsing session, or a household composition. The posterior distribution determination service 428 may provide the posterior distribution of the demographic variable to a prediction service 432. The prediction service 432 may use the posterior distribution of the demographic variable to generate predictions.

As depicted in FIG. 4, a prediction computing system 436 may implement the training data store 416, the training data generation service 420, the prior distribution determination service 424, the posterior distribution determination service 428, and the prediction service 432. In some implementations, the data store 416 and the services may be components of one computing system. In other implementations, the prediction computing system 436 may operate in a distributed computing environment including several computer systems that are interconnected using one or more computer networks. The prediction computing system 402 could also operate within a computing environment having a fewer or greater number of devices or services than are illustrated in FIG. 4. Thus, the depiction of prediction computing system 436 in FIG. 4 should be taken as illustrative and not limiting to the present disclosure. For example, the prediction computing system 436 could implement various Web services components and/or peer-to-peer network configurations to implement at least a portion of the processes described herein.

Figure 5:
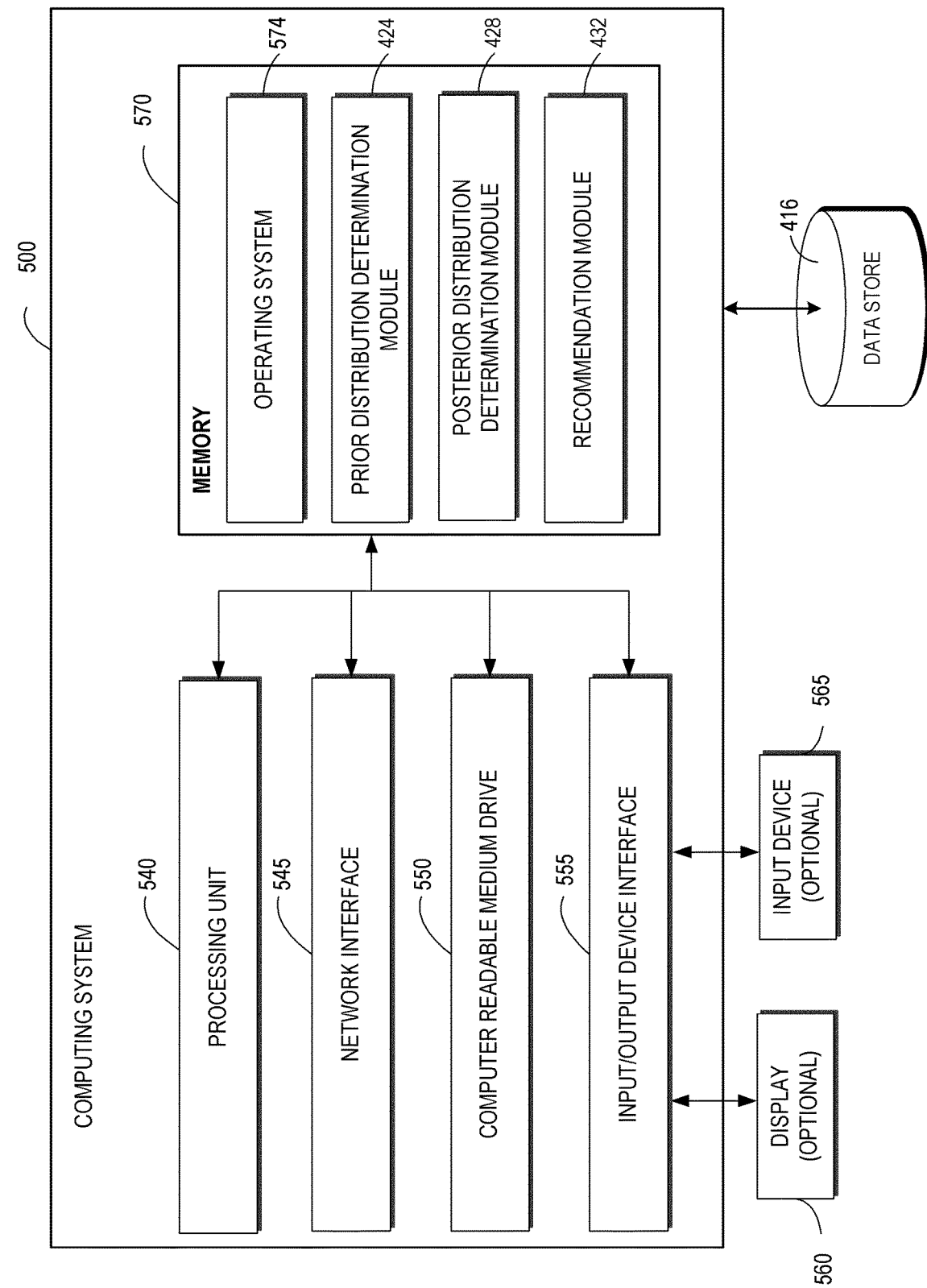
FIG. 5 depicts a general architecture of an example computing device configured to learn demographic information of a user account and generate item recommendations for the user account based on the demographic information.

FIG. 5 depicts a general architecture of an example computing device 500 configured to learn a demographic model and generate a prediction result using the model. The general architecture of the computing device 500 depicted in FIG. 5 includes an arrangement of computer hardware and software components. The computing device 500 may include many more (or fewer) elements than those shown in FIG. 5. It is not necessary, however, that all of these generally conventional elements be shown in order to provide an enabling disclosure. As illustrated, the computing device 500 includes a processing unit 540, a network interface 545, a computer readable medium drive 550, an input/output device interface 555, a display 560, and an input device 565, all of which may communicate with one another by way of a communication bus. The network interface 545 may provide connectivity to one or more networks or computing systems. The processing unit 540 may thus receive information and instructions from other computing systems or services via a network. The processing unit 540 may also communicate to and from memory 570 and further provide output information for an optional display 560 via the input/output device interface 555. The input/output device interface 555 may also accept input from the optional input device 565, such as a keyboard, mouse, digital pen, microphone, touch screen, gesture recognition system, voice recognition system, gamepad, accelerometer, gyroscope, or other input device.

The memory 570 may contain computer program instructions (grouped as modules or components in some embodiments) that the processing unit 540 executes in order to implement one or more embodiments. The memory 570 generally includes RAM, ROM and/or other persistent, auxiliary or non-transitory computer-readable media. The memory 570 may store an operating system 572 that provides computer program instructions for use by the processing unit 540 in the general administration and operation of the computing device 500. The memory 570 may further include computer program instructions and other information for implementing aspects of the present disclosure. For example, in one embodiment, the memory 570 includes a prior distribution determination module 574 that learns prior distributions of a demographic model or a demographic variable. The memory 570 may include a posterior distribution determination module 576 that determines a posterior distribution for a user based on an observed user action. The memory 570 may additionally or alternatively include a prediction module 578 that generates a prediction result from a prediction input vector and a demographic model, such as the demographic model learned by the prior distribution determination module 574 and the posterior distribution determination module 576. In addition, memory 570 may include or communicate with training data store 416 and/or one or more other data stores that stores training data or retraining data.

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules executed by a computing system that includes one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence, can be added, merged, or left out altogether (for example, not all described acts or events are necessary for the practice of the algorithms). Moreover, in certain embodiments, acts or events can be performed concurrently, for example through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a processing unit or processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of computing devices, for example a combination of a DSP and a microprocessor, a plurality of microprocessors, one or more microprocessors in conjunction with a DSP core, or any other such configuration. Although described herein primarily with respect to digital technology, a processor may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Further, the term "each", as used herein, in addition to having its ordinary meaning, can mean any subset of a set of elements to which the term "each" is applied.

Disjunctive language such as the phrase "at least one of X, Y, or Z," unless specifically stated otherwise, is otherwise understood with the context as used in general to present that an item, term, etc., may be either X, Y, or Z, or any combination thereof (for example, X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C can include a first processor configured to carry out recitation A working in conjunction with a second processor configured to carry out recitations B and C.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A computer-implemented method comprising:
as implemented by one or more computing devices configured with specific executable instructions,
defining a user action space comprising at least one of a search history variable, a browsing history variable, a purchase history variable, or a subscription variable;
defining a probability distribution of a demographic variable;
estimating a prior distribution of the demographic variable;
training a probability model relating the user action space and the demographic variable, wherein training data used in training the probability model includes user action data for a plurality of users and demographic information associated with the plurality of users;
receiving an indication of a user action of a user in the user action space, wherein the user action corresponds to at least one variable in the user action space;
determining a posterior distribution of the demographic variable with respect to the user based at least in part on the prior distribution of the demographic variable, the user action of the user, and a Bayesian update; and
predicting a value for the demographic variable with respect to the user based on the posterior distribution of the demographic variable.

2. The method of claim 1, wherein estimating the prior distribution of the demographic variable comprises:
determining the prior distribution of the demographic variable based at least in part on a first distribution of values of the demographic variable for a first plurality of users; and
refining the prior distribution of the demographic variable to generate a refined prior distribution.

3. The method of claim 2, wherein refining the prior distribution of the demographic variable to generate the refined prior distribution comprises: refining the prior distribution of the demographic variable to generate the refined prior distribution based at least in part on a second distribution of values of the demographic variable for a second plurality of users.

4. The method of claim 3, further comprising receiving the second distribution of the values of the demographic variable for the second plurality of users from a data store.

5. The method of claim 4, wherein the data store is managed by a third party.

6. The method of claim 3, wherein the second distribution of the values of the demographic variable for the second plurality of users is based at least in part on at least one of survey data, user information provided during registrations for one or more subscription programs, or social media data.

7. The method of claim 3, wherein the second distribution of the values of the demographic variable comprises one of: a non-information prior distribution of the values of the demographic variable, or a proxy prior distribution of the values of the demographic variable.

8. The method of claim 1, wherein the probability model relating the user action space and the demographic variable comprises a logistic regression model.

9. The method of claim 1, further comprising:
generating a recommendation for the user based at least in part on the posterior distribution of the demographic variable for the user; and
providing the recommendation to a user device associated with the user.

10. The method of claim 1, further comprising providing the posterior distribution and the prior distribution of the demographic variable for the user to a recommendation service, wherein the recommendation service generates a recommendation for the user based at least in part on the posterior distribution and the prior distribution of the demographic variable for the user.

11. The method of claim 10, wherein the recommendation service provides the recommendation to an application, and wherein the application provides the user with the recommendation.

12. The method of claim 10, wherein the recommendation for the user comprises an item of potential interest to the user based on the value of the demographic variable.

13. A system comprising:
a hardware processor configured to execute computer-executable instructions to at least:
define a user action space comprising at least one of a search history variable, a browsing history variable, a purchase history variable, or a subscription variable;
define a probability distribution of a demographic variable;
estimate a prior distribution of the demographic variable;
train a probability model relating the user action space and the demographic variable, wherein training data used in training the probability model includes user action data for a plurality of users and demographic information associated with the plurality of users;
receive an indication of a user action of a user in the user action space, wherein the user action corresponds to at least one variable in the user action space;
determine a posterior distribution of the demographic variable with respect to the user based at least in part on the prior distribution of the demographic variable, the user action of the user, and a Bayesian update; and
predict a value for the demographic variable with respect to the user based on the posterior distribution of the demographic variable.

14. The system of claim 13, wherein estimating the prior distribution of the demographic variable comprises:

determining the prior distribution of the demographic variable based at least in part on a first distribution of values of the demographic variable for a first plurality of users; and refining the prior distribution of the demographic variable to generate a refined prior distribution.

15. The system of claim 14, wherein refining the prior distribution of the demographic variable to generate the refined prior distribution comprises: refining the prior distribution of the demographic variable to generate the refined prior distribution based at least in part on a second distribution of values of the demographic variable for a second plurality of users.

16. The system of claim 15, wherein the second distribution of the values of the demographic variable for the second plurality of users is based at least in part on at least one of survey data, user information provided during registrations for one or more subscription programs, or social media data.

17. The system of claim 15, wherein the second distribution of the values of the demographic variable comprises one of: a non-information prior distribution of the values of the demographic variable, or a proxy prior distribution of the values of the demographic variable.

18. The system of claim 13, wherein the probability model relating the user action space and the demographic variable comprises a logistic regression model.

19. The system of claim 13, wherein the hardware processor is further configured to:

generate a recommendation for the user based at least in part on the posterior distribution of the demographic variable for the user; and provide the recommendation to a user device associated with the user.

* * * * *